(12) United States Patent
Zeng et al.

(10) Patent No.: US 8,483,537 B2
(45) Date of Patent: Jul. 9, 2013

(54) PROTECTING DEVICE FOR CABLE

(75) Inventors: Ding Zeng, Shenzhen (CN); Guang-Kai Wu, Shenzhen (CN); Bao-Guo Li, Shenzhen (CN); Guo-Ping Zeng, Shenzhen (CN); Shao-You Han, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 160 days.

(21) Appl. No.: 13/108,106

(22) Filed: May 16, 2011

(65) Prior Publication Data

US 2012/0051710 A1 Mar. 1, 2012

(30) Foreign Application Priority Data

Aug. 27, 2010 (CN) .......................... 2010 1 0264807

(51) Int. Cl.
*G02B 6/00* (2006.01)
(52) U.S. Cl.
USPC .......................................... 385/137; 439/289
(58) Field of Classification Search
USPC .......................................... 385/137; 439/289
See application file for complete search history.

(56) References Cited

U.S. PATENT DOCUMENTS

| | | | | |
|---|---|---|---|---|
| 4,047,796 A * | 9/1977 | Kao et al. | ......................... | 385/70 |
| 4,348,076 A * | 9/1982 | Oldham | ......................... | 385/69 |
| 4,362,356 A * | 12/1982 | Williams et al. | ................. | 385/80 |
| 4,429,949 A * | 2/1984 | Cartier | ............................. | 385/64 |
| 4,834,494 A * | 5/1989 | DeMeritt et al. | ................. | 385/61 |
| 4,923,274 A * | 5/1990 | Dean | .............................. | 385/72 |
| 4,953,941 A * | 9/1990 | Takahashi | ........................ | 385/72 |
| 5,283,850 A * | 2/1994 | Souloumiac | .................... | 385/84 |
| 5,315,684 A * | 5/1994 | Szegda | .......................... | 385/139 |
| 6,053,639 A * | 4/2000 | Chen | ............................... | 385/53 |
| 7,153,161 B2 * | 12/2006 | Huang | .......................... | 439/583 |
| 2006/0088250 A1 * | 4/2006 | Pimpinella et al. | ............. | 385/78 |
| 2006/0172578 A1 * | 8/2006 | Parsons | ........................ | 439/291 |
| 2007/0140623 A1 * | 6/2007 | Desanti | .......................... | 385/76 |
| 2011/0033157 A1 * | 2/2011 | Drouard | ......................... | 385/77 |
| 2011/0217006 A1 * | 9/2011 | Donaldson et al. | ............. | 385/55 |

FOREIGN PATENT DOCUMENTS

| | | |
|---|---|---|
| CN | 2426647 Y | 4/2001 |
| CN | 201210190 Y | 3/2009 |

* cited by examiner

*Primary Examiner* — Charlie Peng
*Assistant Examiner* — Peter Radkowski
(74) *Attorney, Agent, or Firm* — Altis Law Group, Inc.

(57) ABSTRACT

A protecting device for protecting a cable having a plurality of fibers, includes a conduit which is sleeved on the cable, a distribution member, a first and second clamping members, a first and second fasteners, and a resilient sleeve. The conduit has a first threaded portion on one end of the conduit. The distribution member is being sleeved on the cable, the first clamping member has a plurality of clamping claws for clamping the distribution member; and the first fastener has a restricting portion; the distribution member and the first clamping member are being received in the conduit, the first fastener is engaged with the first threaded portion of the conduit. The plurality of clamping claws of the first clamping member are urged by the restricting portion to tightly clamp the distribution member and the cable.

13 Claims, 4 Drawing Sheets

PROTECTING DEVICE FOR CABLE

BACKGROUND

1. Technical Field

The present disclosure relates generally to a protecting device, more particularly, to a protecting device for protecting a multi-fiber cable from damage.

2. Description of Related Art

More and more optical cables are being used in place of electrical cables to transmit signals. However, optical cables may be easily damaged in some locations such as wet or dusty environments. Therefore, a protecting member is utilized to protect the cable, for example, the cables are run through conduit. However, the protection provided with this method is not sufficiently waterproof and dustproof.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
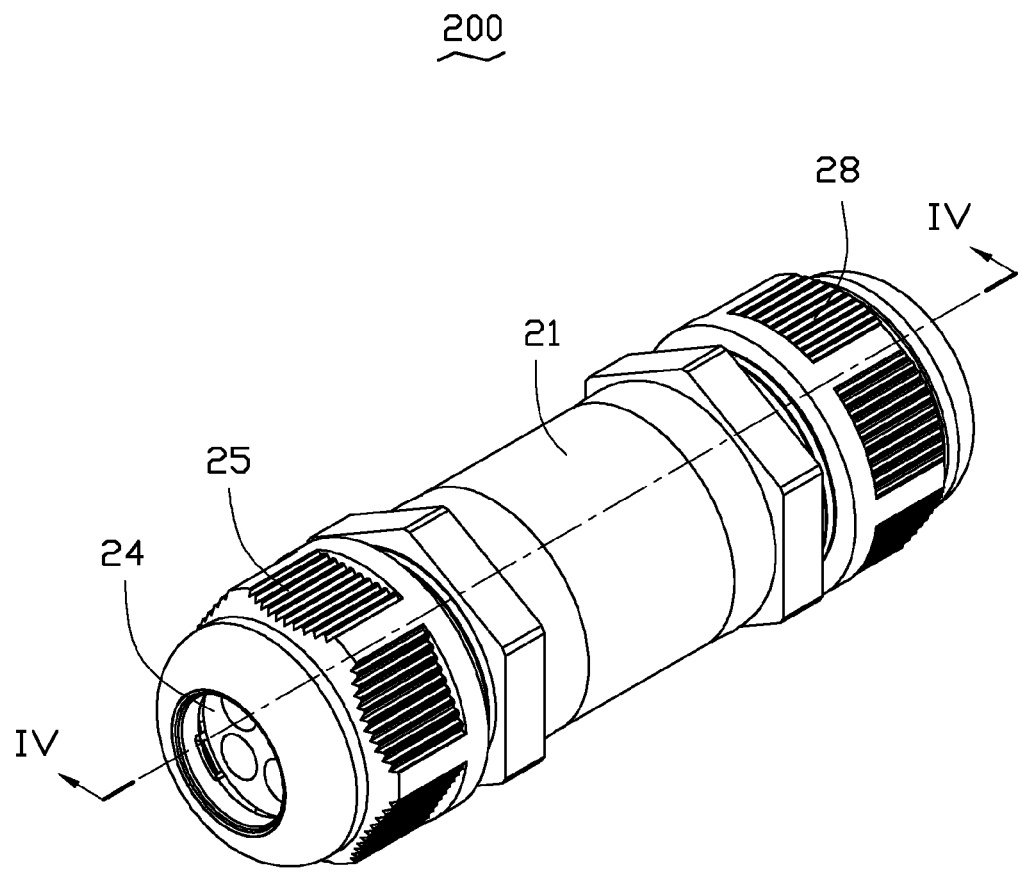
FIG. 1 is an isometric view of one embodiment of a protecting device.
Figure 2:
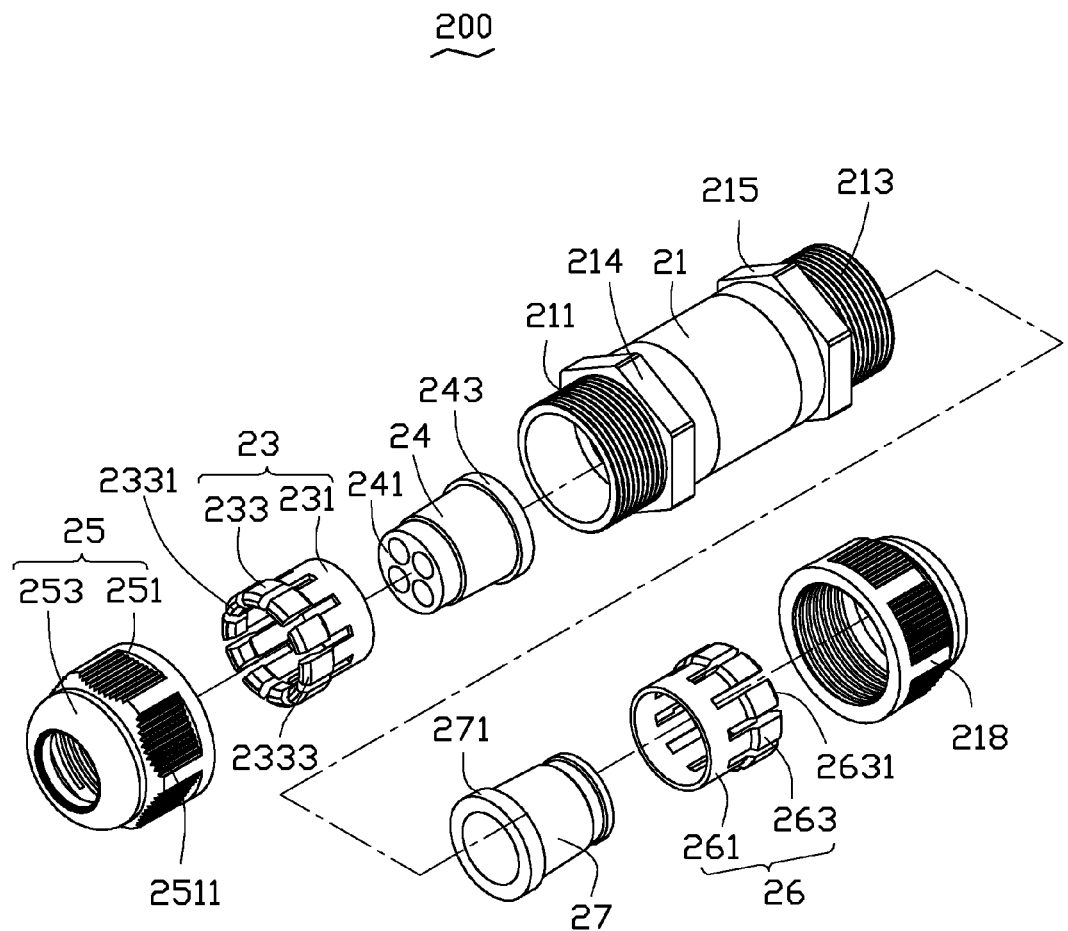
FIG. 2 is an exploded, isometric view of the protecting device of FIG. 1.
Figure 3:
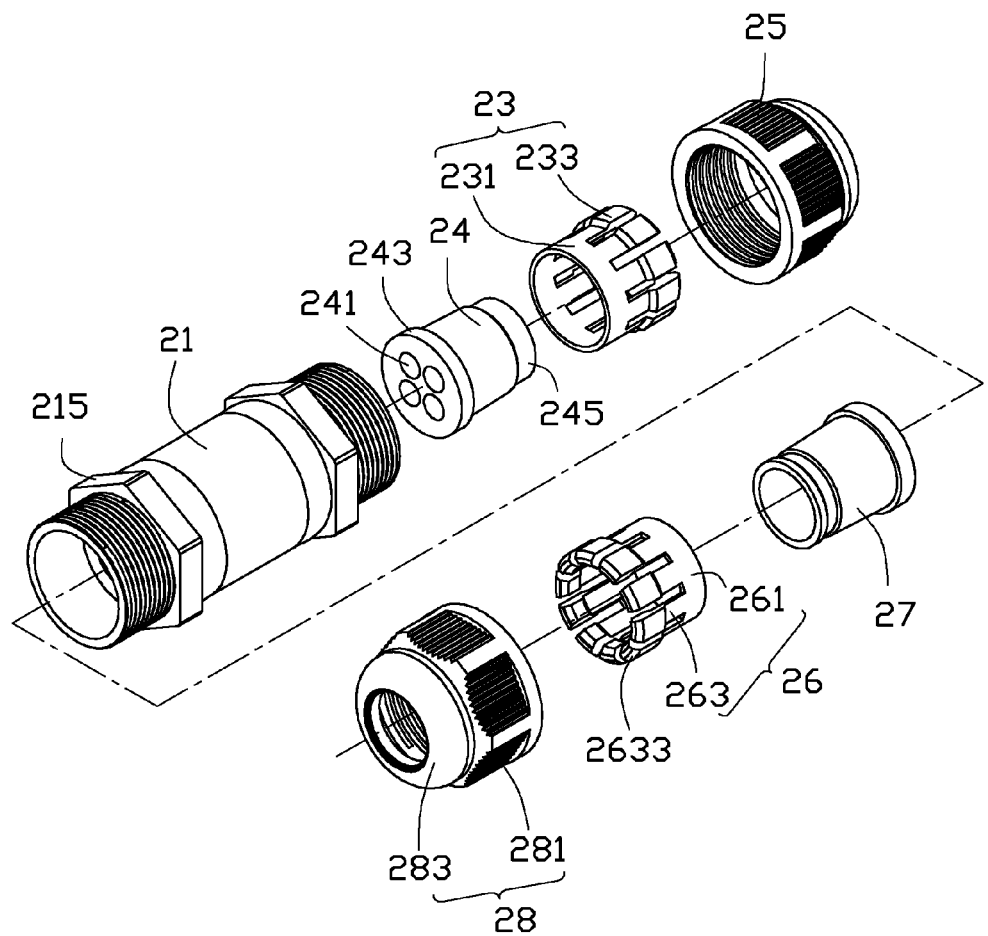
FIG. 3 is similar to FIG. 2, but viewed from another aspect.

Referring to FIGS. 1, 2, and 3, one embodiment of a protecting device 200 includes a conduit 21, a first clamping member 23, a distribution member 24, a first fastener 25, a second clamping member 26, a resilient sleeve 27, and a second fastener 28. The first clamping member 23, the distribution member 24, the second clamping member 26 and the resilient sleeve 27 are located in the conduit 21. The first and second fasteners 25, 28 are mounted on opposite ends of the conduit 21 to secure the first clamping member 23, the distribution member 24, the second clamping member 26 and the resilient sleeve 27 in the conduit 21.

Figure 4:
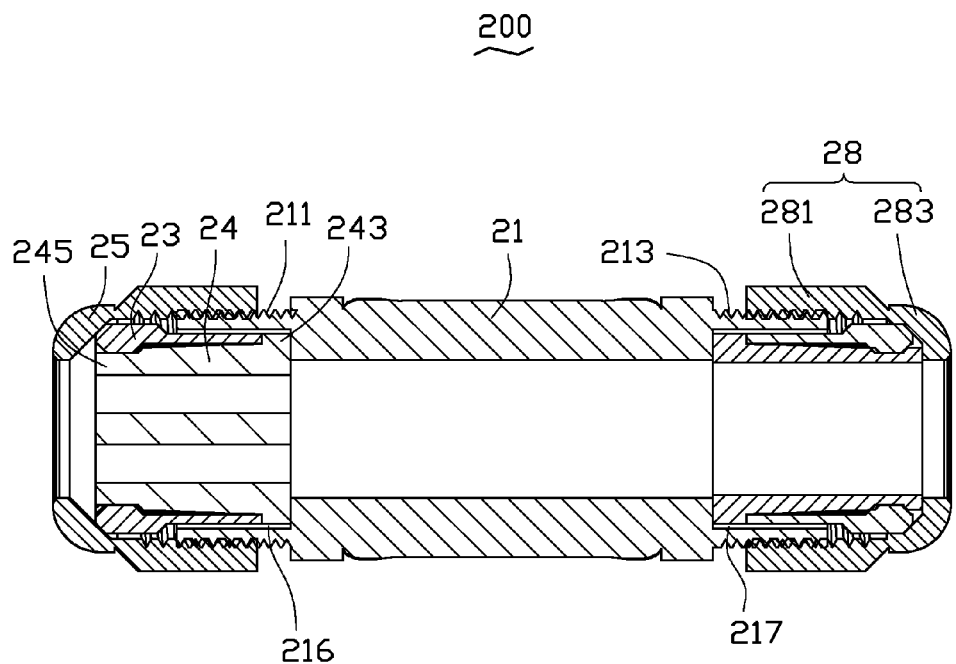
FIG. 4 is a cross-section of the protecting device of FIG. 1, taken along the line IV-IV.

Referring also to FIG. 4, the conduit 21 includes a first threaded portion 211, a second threaded portion 213, a first flange 214, and a second flange 215. The first threaded portion 211 and the second threaded portion 213 are respectively positioned on opposite ends of the conduit 21. The first flange 214 and the second flange 215 are positioned between the first threaded portion 211 and the second threaded portion 213. The first flange 214 is positioned adjacent to the first threaded portion 211 for blocking the first fastener 25, and the second flange 215 is positioned adjacent to the second threaded portion 213 for blocking the second fastener 28. A first receiving portion 216 is formed in an inner wall corresponding to the first threaded portion 211 of the conduit 21. A second receiving portion 217 is defined in an inner wall corresponding to the second threaded portion 213 of the conduit 21. The first clamping member 23 and the distribution member 24 are received in the first receiving portion 216. The second clamping member 26 and the resilient sleeve 27 are received in the second receiving portion 217. In the illustrated embodiment, the conduit 21 is substantially cylindrical, and made from rigid plastic. The first flange 214 and the second flange 215 are polygonal in shape. It should be appreciated that the conduit 21, the first flange 214, and the second flange 215 may be of other shapes, and the conduit 21 may be made from metal materials.

Referring to FIG. 2 again, the first clamping member 23 includes a cylindrical base portion 231 and a plurality of clamping claws 233 extending from a side of the base portion 231. A resisting portion 2331 is formed on an end of each clamping claw 233 away from the base portion 231. An oblique surface 2333 is formed on an outer side of an end of each resisting portion 2331. When the base portion 231 is received in the first fastener 25, the clamping claws 233 are pushed together by contact with the interior of a restricting portion 253. In the illustrated embodiment, the second clamping member 26 is similar to the first clamping member 23, and includes a base portion 261, a plurality of clamping claws 263, a plurality of resisting portions 2631, and a plurality of oblique surfaces 2633.

The first fastener 25 is a screw nut, and includes an internally threaded screw portion 251 and a restricting portion 253. The restricting portion 253 is a substantially dome shaped portion, and is formed on one end of the screw portion 251. A plurality of grooves 2511 are formed on the outside of the screw portion 251 to provide a gripping surface. In the illustrated embodiment, the second fastener 28 is similar to the first fastener 25, and includes an internally threaded screw portion 281 and a restricting portion 283.

The distribution member 24 is substantially cylindrical, and defines a plurality of axial through holes 241. A flange 243 is positioned on an outer side of an end of the distribution member 24, a shrink portion 245 with a reduced diameter is formed an end of the distribution member 24 opposite to the flange 243. In the illustrated embodiment, the distribution member 24 is made from foam materials. It should be appreciated that the distribution member 24 may be made from flexible plastic materials A stopper 271 is positioned on an outer side of an end of the resilient sleeve 27. In the illustrated embodiment, the stopper 271 is a flange. The resilient sleeve 27 is made from flexible plastic material.

In the illustrated embodiment, the protecting device 200 is used to protect a cable (not shown) having four fibers (not shown). In use, the cable is inserted into the screw portion 281 of the second fastener 28, and extended through the resilient sleeve 27 and the conduit 21. Each fiber is respectively inserted into a corresponding one of the axial through holes 241 from an end of the flange 243, and extended through the distribution member 24, the first clamping member 23, and then the first fastener 25. The second clamping member 26 is sleeved on the resilient sleeve 27 with the base portion 261 resisting the stopper 271, and the plurality of clamping claws 263 clamping the outside of the resilient sleeve 27. The second clamping member 26 and the resilient sleeve 27 are received into the second receiving portion 217 of the conduit 21, and the stopper 271 resists a side-wall of the second receiving portion 217. The screw portion 281 of the second fastener 28 engages with the second threaded portion 213, and the second fastener 28 resists the second flange 215. The oblique surfaces 2633 of the second clamping member 26 are urged by the restricting portion 283 of the second fastener 28 to clamp the resilient sleeve 27 for tightly retaining the cable. The first clamping member 23 is sleeved on the distribution member 24 with the base portion 231 resisting the flange 243, and with the plurality of clamping claws 233 clamping an outer surface of the distribution member 24, and the plurality of clamping claws 233 is partially received on a periphery of the shrink portion 245. The first clamping member 23 and the distribution member 24 are received into the first receiving portion 216 of the conduit 21, and the flange 243 resists a side-wall of the first receiving portion 216, the shrink portion 245 is spaced from the first fastener 25. The screw portion 251 of the first fastener 25 engages with the first threaded portion 211, and the first fastener 25 resists the first flange 214. The oblique surfaces 2333 of the first clamping member 23 are urged by the restricting portion 253 of the first fastener 25 to clamp the distribution member 24 for tightly retaining the fibers of the cable.

The cable is stably clamped by the first fastener 25, the first clamping member 23 and the distribution member 24 of the protecting device 200, thus effectively protecting the fibers from being damaged in the event should the cable be unexpectedly pulled. The fibers are separated by the distribution member 24 for easily installation. The distribution member 24 tightly seals the conduit, thereby making the conduit waterproof and dustproof. Therefore, the protecting device 200 can be used in a bad, dusty, or wet environment. The protecting device 200 can be easily taken apart because of having threaded engagement for internal parts, for repairing, assembling and changing damaged parts; therefore, maintenance is less labor intensive and costs are decreased.

It should be appreciated that the resilient sleeve 27, the second clamping member 26 and the second fastener 28 may be omitted when waterproofing and dustproofing are not needed. Correspondingly, the second threaded portion 213 of the conduit 21 and the second flange 215 may be also omitted.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A protecting device for protecting a cable having a plurality of fibers, the protecting device comprising:
    a conduit for being sleeved on the cable, the conduit having a first threaded portion on an end of the conduit;
    a distribution member for being sleeved on the cable;
    a first clamping member having a plurality of clamping claws for clamping the distribution member; and
    a first fastener having a restricting portion; wherein the distribution member and the first clamping member being received in the conduit, the first fastener is engaged with the first threaded portion of the conduit, the restricting portion having a slanted portion urging the first clamping member for the plurality of clamping claws to be tightly clamping the distribution member and the cable, each clamping claw forms a resisting portion for resisting the restricting portion, and each resisting portion has an oblique surface for resisting the slanted portion of the restricting portion, the distribution member comprises a shrink portion at an end thereof with a reduced diameter for receiving the plurality of clamping claws, and the distribution member is spaced from the first fastener.

2. The protecting device of claim 1, wherein the first clamping member further comprises a base portion, the plurality of clamping claws are extending from a side of the base portion.

3. The protecting device of claim 2, wherein the distribution member defines a plurality of axial through holes for the fibers of the cable to be extending through.

4. The protecting device of claim 3, wherein the distribution member further comprises a flange resisting the base portion of the first clamping member.

5. The protecting device of claim 1, wherein the conduit forms a first receiving portion in an end of the first threaded portion, the distribution member and the first clamping member are received in the first receiving portion.

6. The protecting device of claim 5, wherein the conduit comprises a second threaded portion formed on another end, and forms a second receiving portion in the end of the second threaded portion; the protecting device further comprises a second clamping member and a resilient sleeve received in the second receiving portion, and a second fastener engaged with the second threaded portion; the resilient sleeve is configured for being sleeved on the cable, the second clamping member forms a plurality of clamping claws for clamping the resilient sleeve; the second fastener forms a restricting portion, and the plurality of clamping claws of the second clamping member are urged by the restricting portion of the second fastener to tightly clamp the resilient sleeve and the cable.

7. The protecting device of claim 1, wherein the distribution member is made from foam material.

8. A protecting device for protecting a cable having a plurality of fibers, comprising:
    a conduit for being sleeved on the cable, the conduit having a first threaded portion and a second threaded portion on opposite ends of the conduit;
    a distribution member for being sleeved on the cable;
    a first clamping member having a plurality of clamping claws clamping the distribution member;
    a resilient sleeve for being sleeved on the cable;
    a second clamping member having a plurality of clamping claws for clamping the resilient sleeve;
    a first fastener having a restricting portion; and
    a second fastener having a restricting portion, each of the restricting portions of the first fastener and the second fastener having a slanted portion; wherein the distribution member and the first clamping member being received into an end of the conduit, and the resilient sleeve and the second clamping member being received into an another end of the conduit; the first fastener engaging with the first threaded portion of the conduit, and the second fastener engaging with the second threaded portion of the conduit, the plurality of clamping claws of the first and second clamping members urged by the restricting portions of the first and second fasteners, respectively, to tightly clamp the distribution member, the resilient sleeve and the cable, each clamping claw of the first and second clamping members forms a resisting portion for resisting the slanted portions of the first and second fasteners, and each resisting portion has an oblique surface for resisting the slanted portions, the distribution member comprises a shrink portion at an end thereof with a reduced diameter for receiving the plurality of clamping claws, and the distribution member is spaced from the first fastener.

9. The protecting device of claim 8, wherein the conduit further comprises a first flange for resisting the first fastener, and a second flange for resisting the second fastener.

10. The protecting device of claim 8, wherein the resilient sleeve is a flexible plastic conduit.

11. The protecting device of claim 8, wherein the first and second clamping members further comprises a base portion, and the plurality of clamping claws are extending from a side of the base portion.

12. The protecting device of claim 11, wherein the distribution member further comprises a flange resisting the base portion of the first clamping member.

13. The protecting device of claim 8, wherein the distribution member is made from foam material.

\* \* \* \* \*